United States Patent
Lopez et al.

(10) Patent No.: US 12,432,779 B2
(45) Date of Patent: Sep. 30, 2025

(54) MEASUREMENT SIGNAL FOR CHANNEL ESTIMATION

(71) Applicant: Telefonaktiebolaget LM Ericsson (publ), Stockholm (SE)

(72) Inventors: Miguel Lopez, Solna (SE); Leif Wilhelmsson, Lund (SE); Guido Roland Hiertz, Aachen (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 490 days.

(21) Appl. No.: 17/919,929

(22) PCT Filed: Jun. 18, 2020

(86) PCT No.: PCT/EP2020/066953
§ 371 (c)(1),
(2) Date: Oct. 19, 2022

(87) PCT Pub. No.: WO2021/213686
PCT Pub. Date: Oct. 28, 2021

(65) Prior Publication Data
US 2023/0199842 A1    Jun. 22, 2023

(30) Foreign Application Priority Data
Apr. 21, 2020 (WO) ................ PCT/EP2020/061045

(51) Int. Cl.
*H04W 24/10* (2009.01)
*H04W 74/08* (2009.01)
*H04W 74/0816* (2024.01)

(52) U.S. Cl.
CPC ....... *H04W 74/0816* (2013.01); *H04W 24/10* (2013.01); *H04W 74/0866* (2013.01)

(58) Field of Classification Search
CPC ............................... H04L 12/28; H04L 12/50
See application file for complete search history.

(56) References Cited

U.S. PATENT DOCUMENTS 12,212,885 B1 *   1/2025   Drummond ........ H04N 1/00156
2019/0029714 A1   1/2019   Patel et al.
(Continued)

FOREIGN PATENT DOCUMENTS

CN    105009489 A    10/2015
CN    106464468 A    2/2017
(Continued)

OTHER PUBLICATIONS

International Search Report and Written Opinion dated Jan. 13, 2021 for International Application No. PCT/EP2020/066953 filed Jun. 18, 2020; consisting of 13 pages.
(Continued)

*Primary Examiner* — Dang T Ton
(74) *Attorney, Agent, or Firm* — Weisberg I.P. Law, P.A.

(57) ABSTRACT

A method is disclosed of a transmitter configured to transmit a physical layer packet in accordance with a listen-before-talk procedure. The method includes acquiring an indication of a specific time for channel estimation, providing the physical layer packet with at least one measurement signal for channel estimation based on the specific time, and transmitting the physical layer packet. In some embodiments, the physical layer packet is provided with a plurality of midambles, wherein each midamble includes one or more measurement signals for channel estimation. In some embodiments, the physical layer packet is provided with a floating midamble which comprises one or more measurement signals for channel estimation. A method is also disclosed of a receiver configured to receive a physical layer packet transmitted in accordance with a listen-before-talk procedure.

20 Claims, 3 Drawing Sheets

(56) References Cited

U.S. PATENT DOCUMENTS

| | | |
|---|---|---|
| 2019/0053274 A1 | 2/2019 | Kim et al. |
| 2019/0097857 A1 | 3/2019 | Zhang et al. |
| 2019/0149365 A1 | 5/2019 | Chatterjee et al. |
| 2020/0029238 A1 | 1/2020 | Si et al. |
| 2020/0044798 A1 | 2/2020 | Park et al. |

FOREIGN PATENT DOCUMENTS

| | | | |
|---|---|---|---|
| CN | 107078887 A | 8/2017 | |
| CN | 107439048 A | 12/2017 | |
| CN | 109905218 A | 6/2019 | |
| CN | 110266462 A | 9/2019 | |
| CN | 110417534 A | 11/2019 | |
| WO | WO-2021213686 A1 * | 10/2021 | ......... H04L 27/0006 |

OTHER PUBLICATIONS

Tataria, Harsh et al.; 6G Wireless Systems: Vision, Requirements, Challenges, Insights, and Opportunities; Proceedings of the IEEE; vol. 109, No. 7, Mar. 30, 2021, consisting of 34 pages.

Lu, Johnathan S. et al.; A Discrete Environment-Driven GPU-Based Ray Launching Algorithm; IEEE Transactions on Antennas and Propagation, vol. 67, No. 2, Nov. 9, 2018 consisting of 13 pages.

Moghadami, Siavash et al.; A 210 GHz Fully-Integrated OOK Transceiver for Short Range Wireless Chip-to-Chip Communication in 40nm CMOS Technology; IEEE Transactions on Terahertz Science and Technology, vol. 5, No. 5, Aug. 3, 2015, consisting of 5 pages.

Da Silva, Claudio, IEEE 802.11-19/2103r4, IEEE P802.11 Wireless LANS; 802.11 SENS SG Proposed PAR dated Jan. 14, 2020, consisting of 4 pages.

Allegue, Michel et al., IEEE 802.11-17/1850r0; Wi-Fi Sensing: Technical Feasibility, Standardization Gaps dated Nov. 9, 2019, consisting of 27 pages.

Eitan, Alecsander et al., IEEE 802.11-19/1897r0; Wi-Fi Sensing with Doppler measurement in 60GHz band dated Nov. 11, 2019, consisting of 16 pages.

Chinese Office Action and English Summary dated Nov. 22, 2024 for Application No. 202080100042.6, consisting of 10 pages.

Chinese Notice of Allowance and English language summary dated Apr. 14, 2025 for Application No. 202080100042.6, consisting of 7 pages.

* cited by examiner

MEASUREMENT SIGNAL FOR CHANNEL ESTIMATION

CROSS-REFERENCE TO RELATED APPLICATIONS

This application is a Submission Under 35 U.S.C. § 371 for U.S. National Stage Patent Application of International Application No.: PCT/EP2020/066953, filed Jun. 18, 2020 entitled "MEASUREMENT SIGNAL FOR CHANNEL ESTIMATION," which claims priority to International Application No.: PCT/EP2020/061045, filed Apr. 21, 2020, the entireties of both of which are incorporated herein by reference.

TECHNICAL FIELD

The present disclosure relates generally to the field of wireless communication. More particularly, it relates to measurement signals for channel estimation.

BACKGROUND

As is well known, channel estimates can be achieved by performing measurements on received signals, which are transmitted with known content. Such signals are referred to herein as measurement signals.

A problem relating to channel estimation based on measurement signals occurs when a receiving/measuring device is expected to perform channel estimation for one or more specific points in time. Then, the receiving/measuring device needs to receive a measurement signal from a transmitting device in association with each of the specific points in time, which may be cumbersome in some communication scenarios.

For example, it may be cumbersome for a transmitter configured to transmit in accordance with a listen-before-talk (LBT) procedure to provide transmission of a measurement signal at a pre-specified point in time; due to the un-predictable nature of transmission times when LBT procedures are applied.

Therefore, there is a need for approaches to enable channel estimation based on measurement signals from a transmitter operating in accordance with a listen-before-talk procedure.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

Also generally, when a time distance value is referred to herein, it may be interpreted as any suitable time distance value (e.g., a specific time distance value or a time distance threshold value). A time distance may be interpreted as a duration of time, for example. A time distance (duration) between first and second points in time is typically interpreted as having a positive value (i.e., the time distance may be defined as the absolute value of the first point in time minus the second point in time, or as the absolute value of the second point in time minus the first point in time).

It is an object of some embodiments to solve or mitigate, alleviate, or eliminate at least some of the above or other disadvantages.

A first aspect is a method of a transmitter configured to transmit a physical layer packet in accordance with a listen-before-talk procedure. The method comprises acquiring an indication of a specific time for channel estimation, providing the physical layer packet with at least one measurement signal for channel estimation based on the specific time, and transmitting the physical layer packet.

In some embodiments, a midamble may be interpreted as having similar properties, and/or serve similar purposes, as a preamble. Unlike preambles, however, a midamble generally does not prepend a packet for transmission, but occurs during/within the packet.

In some embodiments, providing the physical layer packet with at least one measurement signal for channel estimation based on the specific time comprises providing the physical layer packet with a plurality of midambles, wherein each midamble comprises one or more measurement signals for channel estimation.

In some embodiments, the plurality of midambles have a time distance (or a time duration) between adjacent midambles that is less than twice of a first time distance value (or less than twice of a first duration value).

In some embodiments, transmitting the physical layer packet comprises timing an initial midamble of the plurality to occur before, or coincide with, the specific time and/or timing a last midamble of the plurality to occur after, or coincide with, the specific time.

In some embodiments, transmitting the physical layer packet comprises timing one midamble to coincide with the specific time.

In some embodiments, providing the physical layer packet with at least one measurement signal for channel estimation based on the specific time comprises providing the physical layer packet with a floating midamble which comprises one or more measurement signals for channel estimation.

In some embodiments, providing the physical layer packet with the floating midamble and transmitting the physical layer packet comprises timing the floating midamble to coincide with the specific time, or to occur at a time which is less than a second time distance value (or less than a second duration value) from the specific time.

It should be noted that the term "second duration" is a term for distinguishing from the "first duration". Hence, the second duration can have any suitable length (i.e., the length of the second duration is not limited to be one second).

In some embodiments, the method further comprises including, in a preamble of the physical layer packet, an indication of a location of the floating midamble within the physical layer packet.

In some embodiments, transmitting the physical layer packet is performed within a transmission opportunity, and wherein timing comprises prolonging a previous physical layer packet of the transmission opportunity to adjust a transmission time of the physical layer packet.

In some embodiments, providing the physical layer packet with at least one measurement signal for channel estimation based on the specific time comprises providing the physical layer packet with at least two fields, wherein each field comprises one or more measurement signals for channel estimation, and wherein each field is either a midamble or a part of a preamble of the physical layer packet.

In some embodiments, the at least two fields have a time distance (or a time duration) between adjacent fields that is less than twice of a third time distance value (or less than twice of a third duration value).

In some embodiments, providing the physical layer packet with the fields and transmitting the physical layer packet comprises timing an initial field to occur before, or coincide with, the specific time and timing a last field to occur after, or coincide with, the specific time.

In some embodiments, providing the physical layer packet with the fields and transmitting the physical layer packet comprises timing one of the fields to coincide with the specific time, or to occur at a time which is less than a fourth time distance value (or less than a fourth duration value) from the specific time.

In some embodiments, the method further comprises determining the number of fields based on a maximum time distance (or a maximum duration) between the specific time and a closest field to the specific time.

In some embodiments, the method further comprises acquiring an indication of a maximum acceptable absolute deviation. In some of these embodiments, the step of providing the physical layer packet with at least one measurement signal is performed only when a possible timing of the at least one measurement signal for channel estimation is within the maximum acceptable absolute deviation from the specific time. When no measurement signal for channel estimation has a possible timing within the maximum acceptable absolute deviation from the specific time, the method may comprise refraining from providing the physical layer packet with the at least one measurement signal based on the specific time.

In some embodiments, the at least one measurement signal for channel estimation comprises at least two measurement signals for channel estimation.

In some embodiments, the method further comprises preparing two or more versions of the physical layer packet, wherein each version has the at least one measurement signal inserted at different positions. Then, providing the physical layer packet with at least one measurement signal for channel estimation based on the specific time may comprise selecting one of the versions of the physical layer packet for transmission.

In some embodiments, selecting one of the versions of the physical layer packet for transmission comprises selecting the version which has the measure signal closest to the specific time.

In some embodiments, a midamble comprises an additional preamble inserted in a data field of the physical layer packet.

In some embodiments, the physical layer packet comprises an indication of midamble presence and/or an indication of midamble location within the physical layer packet.

In some embodiments, the indication of midamble presence and/or the indication of midamble location is included in a preamble of the physical layer packet and/or in one or more symbols preceding the midamble.

A second aspect is a method of a receiver configured to receive a physical layer packet transmitted in accordance with a listen-before-talk procedure. The method comprises acquiring an indication of a specific time for channel estimation, receiving the physical layer packet, provided with at least one measurement signal for channel estimation based on the specific time, and performing channel estimation for the specific time based on the at least one measurement signal.

In some embodiments, the physical layer packet is received from a transmitter configured to perform the method of the first aspect.

In some embodiments, the method further comprises providing, to the transmitter, one or more of the indication of the specific time for channel estimation and an indication of a maximum acceptable absolute deviation.

In some embodiments, the physical layer packet is provided with at least one measurement signal for channel estimation based on the specific time by being provided with a floating midamble which comprises one or more measurement signals for channel estimation.

In some embodiments, the method further comprises extracting, from a preamble of the physical layer packet, an indication of a location of the floating midamble within the physical layer packet.

In some embodiments, the physical layer packet is provided with at least two fields, wherein each field comprises one or more measurement signals for channel estimation, and wherein each field is either a midamble or a part of a preamble of the physical layer packet.

In some embodiments, a first field occurs at a first time and a second field occurs at a second time, and performing channel estimation for the specific time comprises (when the first time is before the specific time and the second time is after the specific time) performing channel estimation by interpolation between the first time and the second time, and/or (when the first time and the second time are on a same side of the specific time) performing channel estimation by extrapolation of the first time and the second time.

In some embodiments, the at least one measurement signal for channel estimation comprises at least two measurement signals for channel estimation.

In some embodiments, the method further comprises operating the receiver in a sleep mode at times other than the specific time for channel estimation.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is an apparatus for a transmitter configured to transmit a physical layer packet in accordance with a listen-before-talk procedure. The apparatus comprises controlling circuitry configured to cause acquisition of an indication of a specific time for channel estimation, provision, in the physical layer packet, of at least one measurement signal for channel estimation based on the specific time, and transmission of the physical layer packet.

A fifth aspect is an apparatus for a receiver configured to receive a physical layer packet transmitted in accordance with a listen-before-talk procedure. The apparatus comprises controlling circuitry configured to cause acquisition of an indication of a specific time for channel estimation, reception of the physical layer packet, provided with at least one measurement signal for channel estimation based on the specific time, and performance of channel estimation for the specific time based on the at least one measurement signal.

A sixth aspect is a transmitter device comprising the apparatus of the fourth aspect. A seventh aspect is a receiver device comprising the apparatus of the fifth aspect.

An eighth aspect is a wireless communication device comprising one or more of: the apparatus of the fourth aspect, the apparatus of the fifth aspect, the transmitter device of the sixth aspect, and the receiver device of the seventh aspect.

In some embodiments, any of the above aspects may additionally have features identical with or corresponding to any of the various features as explained above for any of the other aspects.

An advantage of some embodiments is that channel estimation is enabled based on measurement signals from a transmitter operating in accordance with a listen-before-talk procedure.

An advantage of some embodiments is that mitigation is provided for jitter—around a specific time—of the timing of a transmitted measurement signal for channel estimation. For example, mitigation may comprise reduction of the jitter by a transmitter and/or improved handling of the jitter by a receiver.

For example, approaches are provided in some embodiments for a transmitter to reduce the jitter in actual transmission time of measurement signals with respect to a deterministic target transmission schedule (a schedule of specific times).

An advantage of some embodiments is that jitter larger than a maximum acceptable absolute deviation is avoided.

An advantage of some embodiments is that jitter mitigation affects (e.g., improves) robustness and/or accuracy of the channel estimation.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Even if some of the examples herein focus on application to wireless local area network (WLAN) sensing under the standardization of IEEE 802.11, it is noted that embodiments are equally applicable in other scenarios. For example, applicability may be envisioned under other standardizations (e.g., the standardization of the Third Generation Partnership Project, 3GPP) and/or for other functions than sensing (e.g., for radio calibration purposes).

Generally, embodiments are applicable in any situation including channel estimation based on measurement signals from a transmitter operating in accordance with a listen-before-talk procedure, where the channel estimation is desired to be for a specific point in time.

Also generally, references to a listen-before-talk (LBT) procedure are meant to include any procedure where a transmitter is required to perform measurements to determine that the channel is available (e.g., idle) before starting to transmit. Examples include carrier sense multiple access with collision avoidance (CSMA/CA).

In some embodiments, the references herein to transmission in accordance with an LBT procedure may be interpreted as a definition that the transmission is not according to a fixed timing, i.e., the measurement signals for channel estimation are not transmitted in accordance with a deterministic (e.g., centralized) scheduling approach.

In the following, embodiments will be described where approaches are provided to enable channel estimation based on measurement signals from a transmitter operating in accordance with a listen-before-talk procedure, when the channel estimation is expected to be for a specific time.

Figures 1, 2:
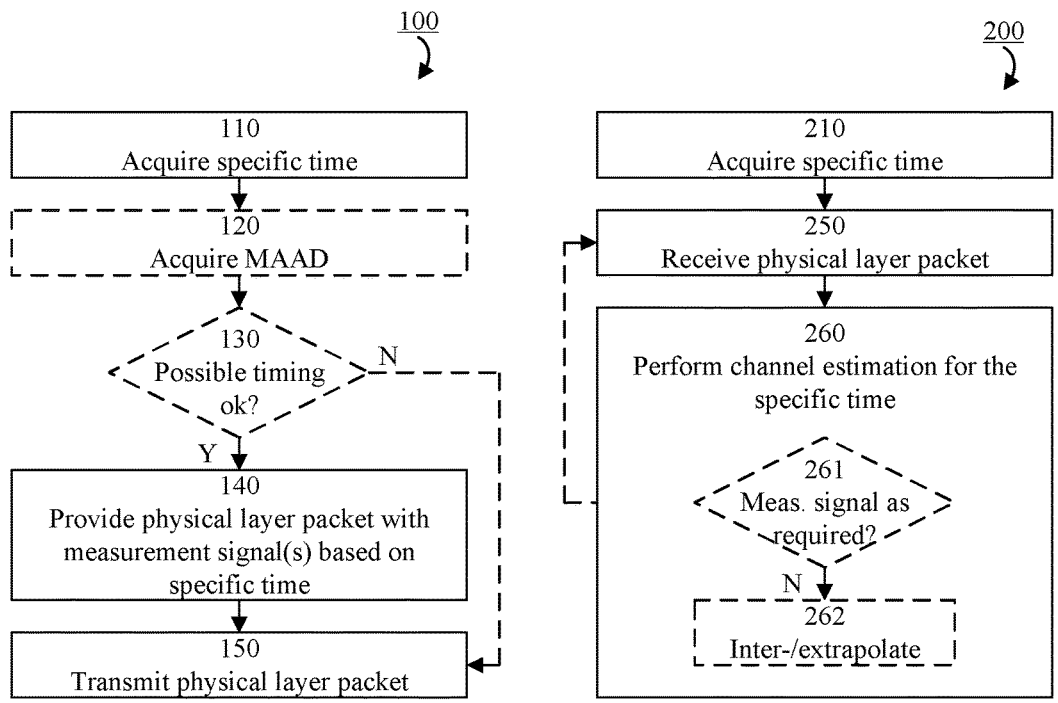
FIG. 1 is a flowchart illustrating example method steps according to some embodiments.
FIG. 2 is a flowchart illustrating example method steps according to some embodiments.

FIG. 1 illustrates an example method 100 according to some embodiments. The method is for a transmitter configured to transmit a physical layer packet in accordance with a listen-before-talk procedure. As will be exemplified in the following, the method comprises providing the physical layer packet with at least one measurement signal (e.g., at least two measurement signals) for channel estimation.

When the transmitter is a WLAN transmitter, the physical layer packet may be a physical layer (PHY) protocol data unit (PPDU) and each measurement signal may correspond to a long training field (LTF).

In step 110, an indication is acquired of a specific time for channel estimation. The specific time may be defined by a point in time and/or a time interval. For example, the indication of the specific time may be indicative of one or more of: a point in time, a start of a time interval, an end of a time interval, a middle of a time interval, and a duration of a time interval.

In some embodiments, acquisition of the specific time comprises acquisition of a plurality of specific times. For example, the plurality of specific times may occur within a specified time period. Alternatively or additionally, the plurality of specific times may be periodically occurring specific times, non-periodically occurring specific times, or otherwise repeatedly occurring specific times. For example, periodically occurring specific times may enable Fourier transforms to be easily applicable when processing the resulting channel estimates (e.g., for WLAN sensing).

In some embodiments, an indication of a maximum acceptable absolute deviation (MAAD) may also be acquired, as illustrated by optional step 120.

It should be noted that even if illustrated as two separate steps in FIG. 1, the indication of the specific time and the indication of the MAAD may be acquired in a single step according to some embodiments.

When the specific time is defined by a point in time, it may be expected that the point in time is included in a time range for which channel estimation is performed, or that the point in time does not deviate from (e.g., an end point of) the time range for which channel estimation is performed by more than a time distance value (more than a duration value; e.g., more than the MAAD).

When the specific time is defined by a time interval, it may be expected that the duration of time is included in a time range for which channel estimation is performed, or that the duration of time has (at least partial) overlap with a time range for which channel estimation is performed, or that (e.g., an end point of) the duration of time does not deviate from (e.g., an end point of) the time range for which channel estimation is performed by more than a time distance value (more than a duration value; e.g., more than the MAAD).

The acquisition of step 110 may comprise one or more of: determining the specific time (possibly combined with transmitting an indication of the determined specific time; e.g., to a receiver device as described later herein), receiving the indication of the specific time from another device (e.g., a receiver device as described later herein, or a central configuration node), and fetching an indication of a predetermined (e.g., standardized) specific time from a memory associated with the transmitter.

Alternatively or additionally, the acquisition of step 120 may comprise one or more of: determining the MAAD (possibly combined with transmitting an indication of the determined MAAD; e.g., to a receiver device as described later herein), receiving the indication of the MAAD from another device (e.g., a receiver device as described later herein, or a central configuration node), and fetching an indication of a predetermined (e.g., standardized) MAAD from a memory associated with the transmitter.

As illustrated by optional step 130, it may be determined (according to some embodiments) whether or not it is possible to transmit a measurement signal for channel estimation in association with the specific time as required. For example, it may be determined whether or not it is possible to transmit a measurement signal for channel estimation which overlaps with the specific time. Alternatively or additionally, it may be determined whether or not it is possible to transmit a measurement signal for channel estimation within that MAAD from the specific time (i.e., whether or not a possible timing of the measurement signal for channel estimation is within the MAAD from the specific time).

When it is determined that it is possible to transmit a measurement signal for channel estimation in association with the specific time as required (Y-path out of step 130), the method proceeds to step 140.

When it is determined that it is not possible to transmit a measurement signal for channel estimation in association with the specific time as required (N-path out of step 130), the method may proceed to step 150 as illustrated in FIG. 1.

Then, a default physical layer packet may be transmitted in step 150; i.e., a physical layer packet transmission where no attempt is made to transmit a measurement signal for channel estimation in association with the specific time. It should be noted that, even if no such attempt is made, it may—by chance—be so that the default physical layer packet is transmitted such that a measurement signal for channel estimation (e.g., an LTF in the preamble of a PPDU) ends up in association with the specific time; even though the physical layer packet is not explicitly and intentionally provided with the measurement signal for channel estimation based on the specific time. Thus, the N-path out of step 130 represents refraining from providing the physical layer packet with a measurement signal for channel estimation based on the specific time.

Alternatively, the method may come to an end without transmission of a physical layer packet when it is determined that it is not possible to transmit a measurement signal for channel estimation in association with the specific time as required.

When it is determined that it is possible to transmit a measurement signal for channel estimation in association with the specific time as required (Y-path out of step 130), the physical layer packet is provided with at least one measurement signal for channel estimation based on the specific time, as illustrated by step 140. The physical layer packet is then transmitted in step 150. It should be noted that step 150 may comprise transmission of one or more physical layer packets.

The transmission time range of a measurement signal for channel estimation corresponds to a possible time range for which channel estimation is to be performed. Thus, it is desirable that the transmission time range of a measurement signal for channel estimation is associated with the specific time, as required (e.g., coincides with the specific time, overlaps the specific time, occurs within the MAAD from the specific time, etc.). This may be accomplished in various ways, a few of which will be described in the following by way of a number of examples. Further exemplification is provided in connection to FIG. 4. It should be noted that, even if not explicitly mentioned herein, suitable combinations of the different examples may also be applicable.

In one example, providing the physical layer packet with at least one measurement signal for channel estimation based on the specific time comprises timing the transmission (step 150) of the physical layer packet such that a standardized measurement signal (e.g., an LTF of a PPDU preamble) is transmitted in association with the specified time, as required.

One way of achieving such timing may be accomplished by adjustment of the transmission time of the physical layer packet within a transmission opportunity (e.g., a TXOP according to IEEE 802.11). Adjustment may, for example, be achieved by delaying or advancing a default transmission time of the physical layer packet. Data padding to prolong a previous physical layer packet is one possibility for delaying a default transmission time of the physical layer packet. Data diminishing (e.g., data puncturing) to shorten a previous physical layer packet is one possibility for advancing a default transmission time of the physical layer packet.

In one example, providing the physical layer packet with at least one measurement signal for channel estimation based on the specific time comprises providing the physical layer packet with a plurality of midambles, wherein each midamble comprises one or more measurement signals for channel estimation.

Generally, a midamble may be defined as a non-data-carrying symbol block inserted in the data-carrying part of a physical layer packet.

The plurality of midambles may, for example, be equidistantly spaced within a data field of the physical layer packet.

Alternatively or additionally, the plurality of midambles may have a time distance (duration) between adjacent midambles that is less than twice of a first time distance value (less than twice of a first duration value; e.g., less than twice the MAAD).

By using a plurality of midambles comprising measurement signals for channel estimation, the probability increases that a measurement signal is transmitted in association with the specified time, as required.

To further increase this probability, the transmission step 150 of some embodiments comprises timing an initial midamble of the plurality to occur before, or coincide with, the specific time and/or timing a last midamble of the plurality to occur after, or coincide with, the specific time and/or timing one midamble of the plurality to coincide with the specific time.

One way of achieving such timing may be accomplished by adjustment of the transmission time of the physical layer packet within a transmission opportunity (e.g., a TXOP according to IEEE 802.11). Adjustment may, for example, be achieved by delaying or advancing a default transmission time of the physical layer packet. Data padding to prolong a previous physical layer packet is one possibility for delaying a default transmission time of the physical layer packet. Data diminishing (e.g., data puncturing) to shorten a previous physical layer packet is one possibility for advancing a default transmission time of the physical layer packet.

In one example, providing the physical layer packet with at least one measurement signal for channel estimation based on the specific time comprises providing the physical layer packet with a floating midamble which comprises one or more measurement signals for channel estimation.

The floating midamble may be inserted such that it is transmitted in association with the specified time, as required. Thus, the floating midamble may be timed (in steps 140 and 150) to coincide with the specific time, or to occur at a time which is less than a second time distance value (less than a second duration value; e.g., less than the MAAD) from the specific time.

Alternatively or additionally to adjusting where in the physical layer packet the floating midamble is provided, one way of achieving such timing may be accomplished by adjustment of the transmission time of the physical layer packet within a transmission opportunity (e.g., a TXOP according to IEEE 802.11). Adjustment may, for example, be achieved by delaying or advancing a default transmission time of the physical layer packet. Data padding to prolong a previous physical layer packet is one possibility for delaying a default transmission time of the physical layer packet. Data diminishing (e.g., data puncturing) to shorten a previous physical layer packet is one possibility for advancing a default transmission time of the physical layer packet.

Generally, a floating midamble may be realized in any suitable form. For example, a floating midamble may be realized as an additional preamble which can be inserted anywhere in a data field of the physical layer packet.

In some embodiments, an indication of the presence and/or an indication of a location of the floating midamble within the physical layer packet is provided to the receiver of the physical layer packet (e.g., by including such indication(s) in a preamble of the physical layer packet and/or in one or more symbols, e.g., orthogonal frequency division multiplexing—OFDM—symbols, preceding the midamble). These approaches may be beneficial for the receiver to recognize and/or localize the midamble (e.g., to avoid that the receiver attempts treating—for example, decoding—the midamble as incoming data).

Some various possibilities for indicating presence and/or location of a midamble are given in the following.

An OFDM symbol immediately preceding the midamble may signal that one or more subsequent (e.g., the next) symbol is not an OFDM symbol but a midamble. This approach may provide an agile and flexible solution. For example, a specific constellation or content of the OFDM symbol could be used to indicate to the receiver to "skip" one or more subsequent symbol durations in its processing of incoming data.

The transmitter may use the "Minimum MPDU Start Spacing field" (e.g., as specified in IEEE 802.11, 2016, 10.13.3) to comprise a midamble. For example, the receiver could be configured to interpret all spacing fields as midambles. Alternatively or additionally, a reserved bit combination in the aggregated MAC (medium access control) protocol data unit, A-MPDU, could indicate that this A-MPDU's spacing field comprises a midamble. End of file (EOF) padding subframes/octets may be used in this context.

An A-MPDU may be inserted that uses an indication that the A-MPDU does not carry data but a midamble. For example, the MPDU delimiter field comprises a reserved bit that can be used to convey this information. Alternatively or additionally, a special MAC address of the locally administered space may be used to indicate midamble presence in this A-MPDU.

An LTF could implicitly signal its own presence. For example, the receiver may be configured to perform matched filtering (in time domain and/or in frequency domain) and detect a midamble when the filter output exceeds a threshold value. The matched filtering may, for example, be performed based on the LTF content as a whole, or based on a subset of the LTF frequency symbols. The latter might decrease the computational complexity and/or might be particularly applicable for the frequency domain and/or at relatively high signal-to-noise rations (SNR).

An information element could be included in the MAC header of the first MPDU to indicate OFDM symbols containing midambles.

In one example (which is particularly applicable when the channel estimating device is configured to apply interpolation and/or extrapolation in relation to two or more measurement signals), providing the physical layer packet with at least one measurement signal for channel estimation based on the specific time comprises providing the physical layer packet with at least two fields, wherein each field comprises one or more measurement signals for channel estimation, and wherein each field is either a midamble or a part of a preamble of the physical layer packet.

For example, the at least two fields may have a time distance (duration) between adjacent fields that is less than twice of a third time distance value (less than twice of a third duration value; e.g., less than twice the MAAD, or a longer time duration acceptable for interpolation and/or extrapolation).

In some embodiments, the number of fields to be provided is determined based on a maximum possible time distance (a maximum possible duration) between the specific time and a field closest to the specific time. Typically, the longer such a maximum possible distance is, the higher the number of fields to be provided becomes.

In some embodiments (which are particularly applicable when the channel estimating device is configured to apply interpolation between two or more measurement signals), providing the physical layer packet with the fields and transmitting the physical layer packet comprises timing an initial field to occur before, or coincide with, the specific time and timing a last field to occur after, or coincide with, the specific time.

Alternatively or additionally, in some embodiments (which are particularly applicable when the channel estimating device is configured to apply interpolation and/or extrapolation in relation to two or more measurement signals), providing the physical layer packet with the fields and transmitting the physical layer packet comprises timing one of the fields to coincide with the specific time, or to occur at a time which is less than a fourth time distance value (less than a fourth duration value; e.g., less than the MAAD, or a longer time duration acceptable for interpolation and/or extrapolation) from the specific time.

One way of achieving such timing may be accomplished by adjustment of the transmission time of the physical layer packet within a transmission opportunity (e.g., a TXOP according to IEEE 802.11). Adjustment may, for example, be achieved by delaying or advancing a default transmission time of the physical layer packet. Data padding to prolong a previous physical layer packet is one possibility for delaying a default transmission time of the physical layer packet. Data diminishing (e.g., data puncturing) to shorten a previous physical layer packet is one possibility for advancing a default transmission time of the physical layer packet.

Generally, it should be noted that various time distance values (various duration values) referred to herein (e.g., any of the first, second, third, fourth fifth, and sixth time distance values) may be the same or different values, as suitable.

In some embodiments, the transmitter may prepare several (e.g., two or more) versions of the physical layer packet, where each version has measurement signal(s) inserted at different positions, and step 140 may comprise selecting one of the versions of the physical layer packet for transmission (typically, a version which has a measurement signal that is acceptably close to the specific time; e.g., the version which has the measure signal closest to the specific time). The preparation of the several versions of the physical layer packet may be performed at any suitable time (e.g., at a default time for packet preparation). Alternatively or additionally, the selection may be may be performed at any suitable time (e.g., when the time for transmission has been acquired; for example, when a backoff has expired and/or when the transmitter gains access to the transmission medium).

The embodiments where several versions of the physical layer packet are prepared may be particularly beneficial when there are hardware constraints of the transmitter which hinders dynamically inserting measurement signal(s) at times very close to a transmission time.

FIG. 2 illustrates an example method 200 according to some embodiments. The method is for a receiver configured to receive a physical layer packet in accordance with a listen-before-talk procedure. The physical layer packet is provided with at least one measurement signal (e.g., at least two measurement signals) for channel estimation.

When the receiver is a WLAN receiver, the physical layer packet may be a physical layer (PHY) protocol data unit (PPDU) and each measurement signal may correspond to a long training field (LTF).

In step 210, an indication is acquired of a specific time for channel estimation (compare with step 110 of FIG. 1). The specific time may be defined by a point in time and/or a time interval. For example, the indication of the specific time may be indicative of one or more of: a point in time, a start of a time interval, an end of a time interval, a middle of a time interval, and a duration of a time interval.

In some embodiments, acquisition of the specific time comprises acquisition of a plurality of specific times. For example, the plurality of specific times may occur within a specified time period. Alternatively or additionally, the plurality of specific times may be periodically occurring specific times, non-periodically occurring specific times, or otherwise repeatedly occurring specific times.

The acquisition of step 210 may comprise one or more of: determining the specific time (possibly combined with transmitting an indication of the determined specific time; e.g., to a transmitter device such as the transmitter described in connection with FIG. 1), receiving the indication of the specific time from another device (e.g., a transmitter device such as the transmitter described in connection with FIG. 1, or a central configuration node), and fetching an indication of a predetermined (e.g., standardized) specific time from a memory associated with the receiver.

In some embodiments, an indication of a maximum acceptable absolute deviation (MAAD) may also be acquired (compare with step 120 of FIG. 1).

In step 250, a physical layer packet is received (compare with step 150 of FIG. 1), wherein the physical layer packet is provided with at least one measurement signal for channel estimation based on the specific time.

For example, the physical layer packet may be received from a transmitter configured to perform the method as described in connection with FIG. 1, and the physical layer packet may be provided with at least one measurement signal for channel estimation based on the specific time in accordance to any of the embodiments described in connection with FIG. 1.

In step 260, channel estimation is performed for the specific time based on the at least one measurement signal. If there are more physical layer packets to receive, the method may return to step 250 after execution of step 260.

In some embodiments, the receiver may be in a sleep mode (e.g., a light sleep mode or a doze mode) prior to, and/or during part(s) of, the reception of the physical layer packet (e.g., before the specific time for channel estimation and/or after the specific time for channel estimation and/or between specific times for channel estimation). This may have the advantage of improved energy efficiency of the receiver. Typically, the receiver is not in a sleep mode during reception of an initial part (e.g., the preamble) of the physical layer packet.

When the physical layer packet is provided with a floating midamble which comprises one or more measurement signals for channel estimation, the method 200 may further comprise determining (e.g., based on a preamble of the physical layer packet and/or based on one or more symbols, e.g., OFDM symbols, preceding the midamble) presence of a floating midamble and/or extracting (e.g., from a preamble of the physical layer packet and/or from one or more symbols, e.g., OFDM symbols, preceding the midamble) an indication of a location of the floating midamble within the physical layer packet.

Channel estimation based on a measurement signal transmitted in association with the specific time (e.g., coinciding with the specific time, overlapping with the specific time, deviating from the specific time by less than the MAAD, etc.) may be performed according to any suitable channel estimation approach.

In some embodiments, the receiver may be capable of applying interpolation and/or extrapolation in relation to two or more measurement signals to achieve the channel estimation. For example, the interpolation or extrapolation may be in relation to at least two fields provided in the physical layer packet, wherein each field comprises one or more measurement signals for channel estimation, and wherein each field is either a midamble or a part of a preamble of the physical layer packet.

Assuming a first field occurs at a first time and a second field occurs at a second time, channel estimation for the specific time may be performed by interpolation between the first time and the second time when the first time is before the specific time and the second time is after the specific time, and channel estimation for the specific time may be performed by extrapolation of the first time and the second time when the first time and the second time are on the same side (i.e., both before, or both after) of the specific time.

For example, interpolation and/or extrapolation may be used when the time distance (duration) between the specific time and the closest field is less than a fifth time distance value (less than a fifth duration value; e.g., defining when interpolation and/or extrapolation is suitable, or at all possible) and/or when the time distance (duration) between the specific time and the closest field is more than a sixth time distance value (more than a sixth duration value; e.g., defining when channel estimation based on one measurement signal is not suitable, or at all possible; e.g., more than the MAAD).

In some embodiments, the more fields that are used for interpolation and/or extrapolation the larger the time distance (duration) is between the specific time and the closest field.

In some embodiments, the method 200 may comprise a step of determining whether or not a measurement signal for channel estimation was transmitted in association with the specific time as required. For example, it may be determined whether or not a measurement signal for channel estimation was transmitted which overlaps with the specific time. Alternatively or additionally, it may be determined whether or not a measurement signal for channel estimation was transmitted within that MAAD from the specific time.

The step of determining whether or not a measurement signal for channel estimation was transmitted in association with the specific time as required may be seen as a sub-step to step 260 as illustrated by the example optional sub-step 261, or as a separate step preceding step 260.

When it is determined that a measurement signal for channel estimation was transmitted in association with the specific time as required, the method proceeds to perform the channel estimation based on that measurement signal in step 260.

When it is determined that a measurement signal for channel estimation was not transmitted in association with the specific time as required, the method may proceed to perform channel estimation based on other measurement signals, if possible.

Alternatively or additionally, the method may come to an end without channel estimation when it is determined that no measurement signal for channel estimation was transmitted in association with the specific time as required.

Yet alternatively or additionally, as illustrated by optional sub-step 262, channel estimation may be performed by interpolation and/or extrapolation when it is determined that a measurement signal for channel estimation was not transmitted in association with the specific time as required (N-path out of sup-step 261; e.g., when the time distance (duration) between the specific time and the closest field is more than the sixth time distance value). For example, interpolation and/or extrapolation may then be used as long as the time distance (duration) between the specific time and the closest field is less than the fifth time distance value, and the method may come to an end without channel estimation otherwise.

Generally, the result of the channel estimation may be used for any suitable purpose. For example, the channel estimation result may be used for positioning and/or radio environment derivation (e.g., in the context of WLAN sensing). Alternatively or additionally, the channel estimation result may be used for radio calibration.

In some embodiments, a sensing method (e.g., a WLAN sensing method) comprises causing execution of the method 200 in a plurality of receiver devices, collection of corresponding channel estimation results, and using machine learning to provide sensing results (e.g., positioning information and/or radio environment information) based on statistics of the collected channel estimation results. Such a sensing method may be performed in a receiver device (e.g., one of the receivers executing the method 200) or in a central node associated with the plurality of receiver devices.

Figure 3:
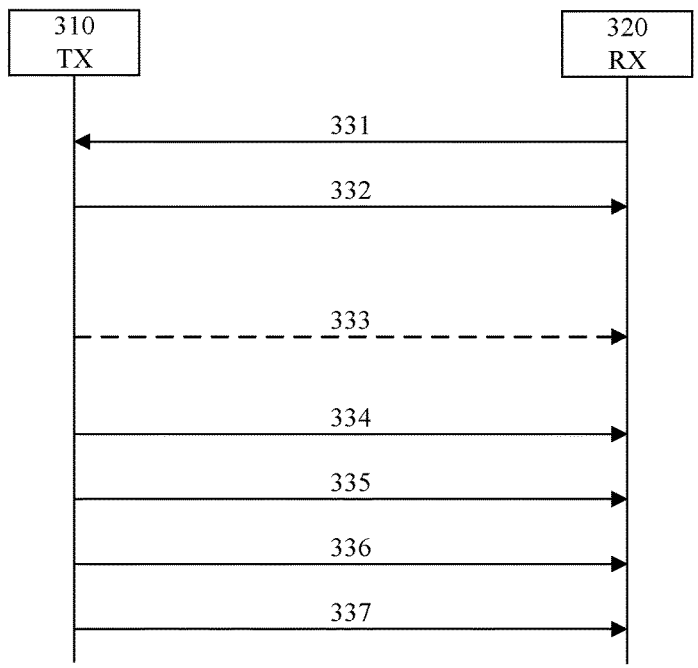
FIG. 3 is a signaling diagram illustrating example signaling according to some embodiments.

FIG. 3 illustrates example signaling according to some embodiments, between a transmitter (TX; e.g., the transmitter adapted to perform the method 100 of FIG. 1) 310 and a receiver (RX; e.g., the receiver adapted to perform the method 200 of FIG. 2) 320.

The process is initiated by the receiver 320 by transmission of a request signal 331. For example, the request signal may be indicative of one or more specific times when measurement signals for channel estimation are desired (compare with step 210 of FIG. 2).

The one or more specific times may be defined in any suitable way (e.g., any of the ways described in connection with FIGS. 1 and/or 2). For example, the request signal 331 may indicate a start time for a period comprising measurement signals for channel estimation, a duration for the period comprising measurement signals for channel estimation, and a periodicity of measurement signals for channel estimation.

In various embodiments, the request signal 331 may be further indicative of a maximum acceptable absolute deviation and/or the receiver being capable of interpolation and/or extrapolation.

When the request signal has been received by the transmitter 310 (compare with step 110 of FIG. 1), the transmitter responds by transmission of a response signal 332. For example, the response signal may be indicative of an acknowledgement that measurement signals for channel estimation will be provided in association with the one or more specific times.

Before starting transmission of the measurement signals for channel estimation as described in connection with FIG. 1, the transmitter 310 may alert the receiver 320 by transmission of a start signal 333. For example, the start signal may indicate the start time for a period comprising measurement signals for channel estimation. In some embodiments, the start signal 333 may be comprised within the response signal 332.

The measurement signals for channel estimation (compare with step 150 of FIG. 1 and step 250 of FIG. 2) are illustrated in FIG. 3 by the four example signals 334, 335, 336 and 337. For example, each of the signals 334, 335, 336 and 337 may represent transmission of a PPDU comprising one or more LTFs.

It should be noted that, in various embodiments, the process may be initiated by the receiver (as exemplified in FIG. 3), or by the transmitter, or by a central node.

Figure 4:
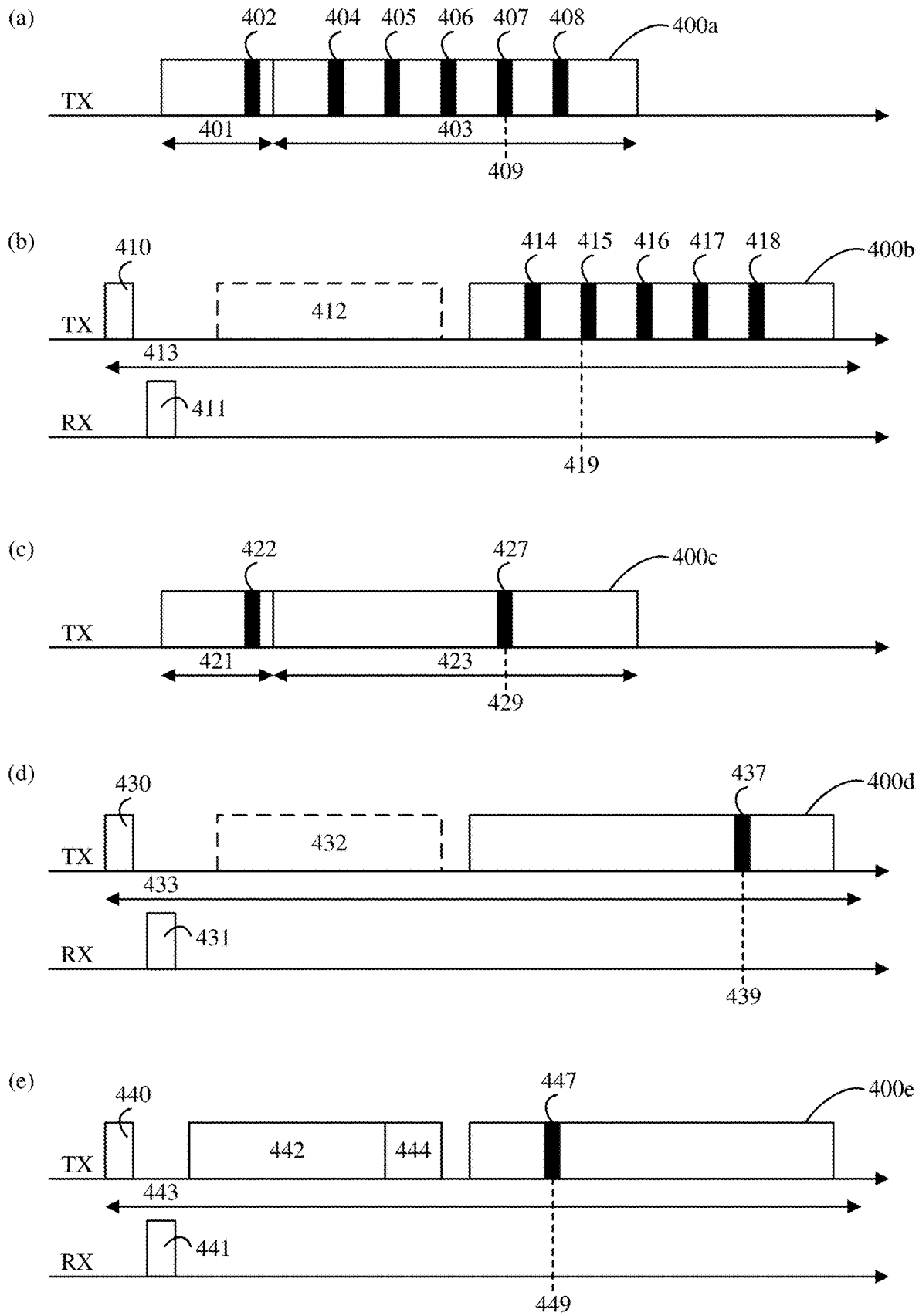
FIG. 4 is a schematic drawing illustrating example physical layer packets according to some embodiments.

FIG. 4 schematically illustrates some example physical layer packets according to various embodiments. The example physical layer packets of FIG. 4 may be applicable in the context described above for the methods of FIGS. 1 and 2.

Part (a) illustrates a physical layer packet 400a for transmission by a transmitter (TX). The physical layer packet 400a is provided with a plurality of midambles 404, 405, 406, 407, 408, wherein each midamble comprises one or more measurement signals for channel estimation. The midamble 407 coincides with a specific time 409 as elaborated on above.

When the physical layer packet 400a is an IEEE 802.11 PPDU, the measurement signals for channel estimation may be LTFs. The PPDU may comprise a preamble 401 with a preamble LTF 402, and a data field 403 comprising the midambles which in turn comprises one or more LTFs each.

As mentioned before, using a plurality of midambles comprising measurement signals for channel estimation increases the probability that a measurement signal (of the preamble or any of the midambles) is transmitted in association with the specified time 409, as required.

The plurality of midambles may have a time distance (duration) between adjacent midambles (and possibly between the LTF of a possible preamble and the first midamble) that is less than twice of a first time distance value (less than twice of a first duration value; e.g., twice of MAAD), further increasing the above probability.

If it is possible to adjust the transmission time of the physical layer packet 400a, it may be beneficial to transmit the physical layer packet such that an initial midamble 404 (or an LTF 402 of a possible preamble) occurs before, or coincides with, the specific time 409. Alternatively or additionally, it may be beneficial to transmit the physical layer packet such that a last midamble 408 occurs after, or coincides with, the specific time 409. Yet alternatively or additionally, it may be beneficial to transmit the physical layer packet such that one midamble coincides with the specific time 409.

Part (b) illustrates a physical layer packet 400b for transmission by a transmitter (TX). The physical layer packet 400b is provided with a plurality of midambles 414, 415, 416, 417, 418, wherein each midamble comprises one or more measurement signals for channel estimation. The midamble 415 coincides with a specific time 419 as elaborated on above.

When the physical layer packet 400b is an IEEE 802.11 PPDU, the measurement signals for channel estimation may be LTFs.

As mentioned before, using a plurality of midambles comprising measurement signals for channel estimation increases the probability that a measurement signal (of the preamble or any of the midambles) is transmitted in association with the specified time 419, as required.

The plurality of midambles may have a time distance (duration) between adjacent midambles (and possibly between the LTF of a possible preamble and the first midamble) that is less than twice of a first time distance value (less than twice of a first duration; e.g., less than twice of MAAD), further increasing the above probability.

If it is possible to adjust the transmission time of the physical layer packet 400b, it may be beneficial to transmit the physical layer packet such that an initial midamble 414 occurs before, or coincides with, the specific time 419. Alternatively or additionally, it may be beneficial to transmit the physical layer packet such that a last midamble 418 occurs after, or coincides with, the specific time 419. Yet alternatively or additionally, it may be beneficial to transmit the physical layer packet such that one midamble coincides with the specific time 419.

Part (b) illustrates a scenario wherein it may be possible to adjust the transmission time of the physical layer packet 400b due to that the transmission is within a transmission opportunity 413 (compare with TXOP of IEEE 802.11).

The transmission opportunity 413 commences by the transmitter (TX) transmitting a request-to-send (RTS) signal 410, and a receiver (RX) transmitting a corresponding clear-to-send (CTS) signal 411.

Within the transmission opportunity 413, the transmitter has the possibility to adjust the transmission time of the physical layer packet 400b; e.g., delaying or advancing a default transmission time of the physical layer packet. Data padding to prolong a previous physical layer packet 412 is one possibility for delaying a default transmission time of the physical layer packet. Data diminishing (e.g., data puncturing) to shorten a previous physical layer packet 412 is one possibility for advancing a default transmission time of the physical layer packet.

Part (c) illustrates a physical layer packet 400c for transmission by a transmitter (TX). The physical layer packet 400c is provided with a floating midamble 427 which comprises one or more measurement signals for channel estimation. The floating midamble 427 coincides with a specific time 429 as elaborated on above.

When the physical layer packet 400c is an IEEE 802.11 PPDU, the measurement signals for channel estimation may be LTFs. The PPDU may comprise a preamble 421 with a preamble LTF 422, and a data field 423 comprising the floating midamble which in turn comprises one or more LTFs. The preamble may comprise an indication of the location of the floating midamble within the physical layer packet.

Preferably, the floating midamble 427 is inserted at a location of the physical layer packet which will coincide with the specific time 429, or occur at a time which is less than a second time distance value (less than a second duration value; e.g., less than MAAD) from the specific time.

If it is possible to adjust the transmission time of the physical layer packet 400c, it may be beneficial to transmit the physical layer packet such that the floating midamble 427 (or an LTF 422 of a possible preamble) coincides with the specific time 429.

Part (d) illustrates a physical layer packet 400d for transmission by a transmitter (TX). The physical layer packet 400d is provided with a floating midamble 437 which comprises one or more measurement signals for channel estimation. The floating midamble 437 coincides with a specific time 439 as elaborated on above.

When the physical layer packet 400d is an IEEE 802.11 PPDU, the measurement signals for channel estimation may be LTFs.

If it is possible to adjust the transmission time of the physical layer packet 400d, it may be beneficial to transmit the physical layer packet such that the floating midamble 437 coincides with the specific time 439.

Part (d) illustrates a scenario wherein it may be possible to adjust the transmission time of the physical layer packet 400d due to that the transmission is within a transmission opportunity 433 (compare with TXOP of IEEE 802.11).

The transmission opportunity 433 commences by the transmitter (TX) transmitting a request-to-send (RTS) signal 430, and a receiver (RX) transmitting a corresponding clear-to-send (CTS) signal 431.

Within the transmission opportunity 433, the transmitter has the possibility to adjust the transmission time of the physical layer packet 400d; e.g., delaying or advancing a default transmission time of the physical layer packet. Data padding to prolong a previous physical layer packet 432 is one possibility for delaying a default transmission time of the physical layer packet. Data diminishing (e.g., data puncturing) to shorten a previous physical layer packet 432 is one possibility for advancing a default transmission time of the physical layer packet.

Part (e) illustrates a scenario wherein it may be possible to adjust the transmission time of a physical layer packet 400e due to that the transmission is within a transmission opportunity 443 (compare with TXOP of IEEE 802.11).

The transmission opportunity 443 commences by the transmitter (TX) transmitting a request-to-send (RTS) signal 440, and a receiver (RX) transmitting a corresponding clear-to-send (CTS) signal 441.

Within the transmission opportunity 443, the transmitter has the possibility to adjust the transmission time of the physical layer packet 400e; e.g., delaying or advancing a default transmission time of the physical layer packet. Data padding 444 to prolong a previous physical layer packet 442 is one possibility for delaying a default transmission time of the physical layer packet. Data diminishing (e.g., data puncturing) to shorten a previous physical layer packet is one possibility for advancing a default transmission time of the physical layer packet.

Generally, a possibility to adjust the transmission time of a physical layer packet may be used to transmit the physical layer packet 400e such that any suitable measurement signal 447 for channel estimation (e.g., an LTF of a possible preamble or a midamble) comprised in the physical layer packet coincides with a specific time 449 as elaborated on above.

Figure 5:
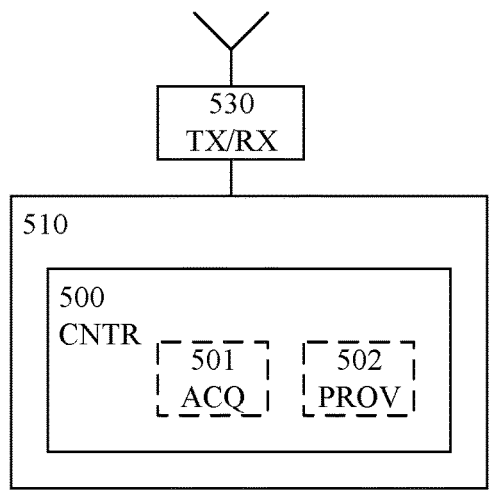
FIG. 5 is a schematic block diagram illustrating an example apparatus according to some embodiments.

FIG. 5 schematically illustrates an example apparatus 510 according to some embodiments. The apparatus is for a transmitter (TX; e.g., transmitting circuitry or a transmission module)—illustrated herein as part of a transceiver (TX/RX) 530—configured to transmit a physical layer packet in accordance with a listen-before-talk procedure.

The apparatus 510 and/or the transceiver 530 may be comprised in a transmitter device, such as a wireless communication device. An example wireless communication device is a station (STA) configured for operation in accordance with IEEE 802.11.

For example, the apparatus 510 may be configured to perform, or cause performance of, one or more of the method steps described in connection with FIG. 1.

The apparatus 510 comprises a controller (CNTR; e.g., controlling circuitry or a control module) 500.

The controller 500 is configured to cause acquisition of an indication of a specific time for channel estimation (compare with step 110 of FIG. 1). To this end, the controller may comprise or be otherwise associated with (e.g., connectable, or connected, to) an acquirer (ACQ; e.g., acquiring circuitry or an acquisition module) 501. The acquirer may be configured to acquire the indication of a specific time for channel estimation (e.g., by determination of the specific time, by reception of the indication of the specific time from another device, or by fetching of an indication of the specific time from a memory associated with the transmitter).

The controller 500 is also configured to cause provision, in the physical layer packet, of at least one measurement signal for channel estimation based on the specific time (compare with step 140 of FIG. 1). To this end, the controller may comprise or be otherwise associated with (e.g., connectable, or connected, to) a provisioner (PROV; e.g., provisioning circuitry or a provision module) 502. The provisioner may be configured to provide at least one measurement signal for channel estimation in the physical layer packet based on the specific time (e.g., according to any of the examples mentioned herein).

The controller 500 is also configured to cause transmission of the physical layer packet (compare with step 150 of FIG. 1). To this end, the controller may be comprised in, or be otherwise associated with (e.g., connectable, or connected, to) the transmitter (TX). The transmitter may be configured to transmit the physical layer packet (e.g., according to any of the examples mentioned herein).

Figure 6:
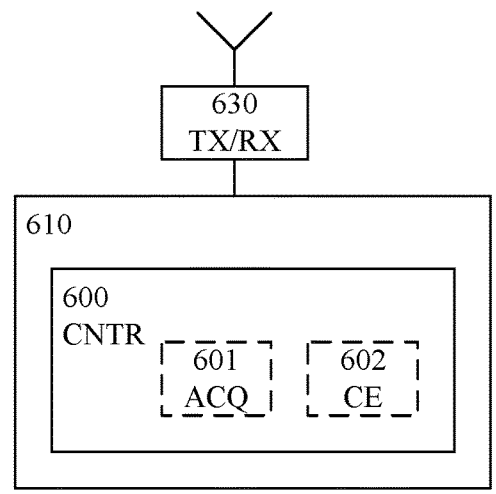
FIG. 6 is a schematic block diagram illustrating an example apparatus according to some embodiments.

FIG. 6 schematically illustrates an example apparatus 610 according to some embodiments. The apparatus is for a receiver (RX; e.g., receiving circuitry or a reception module)—illustrated herein as part of a transceiver (TX/RX) 630—configured to receive a physical layer packet in accordance with a listen-before-talk procedure.

The apparatus 610 and/or the transceiver 630 may be comprised in a receiver device, such as a wireless communication device. An example wireless communication device is a station (STA) configured for operation in accordance with IEEE 802.11.

For example, the apparatus 610 may be configured to perform, or cause performance of, one or more of the method steps described in connection with FIG. 2.

The apparatus 610 comprises a controller (CNTR; e.g., controlling circuitry or a control module) 600.

The controller 600 is configured to cause acquisition of an indication of a specific time for channel estimation (compare with step 210 of FIG. 2). To this end, the controller may comprise or be otherwise associated with (e.g., connectable, or connected, to) an acquirer (ACQ; e.g., acquiring circuitry or an acquisition module) 601. The acquirer may be configured to acquire the indication of a specific time for channel estimation (e.g., by determination of the specific time, by reception of the indication of the specific time from another device, or by fetching of an indication of the specific time from a memory associated with the receiver).

The controller 600 is also configured to cause reception of the physical layer packet, provided with at least one measurement signal for channel estimation based on the specific time (compare with step 250 of FIG. 2). To this end, the controller may be comprised in, or be otherwise associated with (e.g., connectable, or connected, to) the receiver (RX). The receiver may be configured to receive the physical layer packet (e.g., according to any of the examples mentioned herein).

The controller 600 is also configured to cause performance of channel estimation for the specific time based on the at least one measurement signal (compare with step 260 of FIG. 2). To this end, the controller may comprise or be otherwise associated with (e.g., connectable, or connected, to) a channel estimator (CE; e.g., channel estimating circuitry or a channel estimation module) 602. The channel estimator may be configured to perform the channel estimation for the specific time based on the at least one measurement signal.

A particular application of some embodiments will now be described in the context of WLAN sensing.

The IEEE 802.11 standardization group has approved a Project Authorization Request (PAR) for wireless local area network (WLAN) sensing, one object of which is to develop an amendment to the IEEE 802.11 standard as follows.

"This amendment defines modifications to the IEEE 802.11 medium access control layer (MAC), the physical layer (PHY) of Directional Multi Gigabit (DMG), and the PHY under development of Next Generation 60 GHz (NG60) that enhance Wireless Local Area Network (WLAN) sensing (SENS) operation in license-exempt frequency bands between 1 GHz and 7.125 GHz and above 45 GHz. This amendment defines:

at least one mode that enables stations (STAs) to perform one or more of the following: to exchange WLAN sensing capabilities, to request and setup transmissions that allow for WLAN sensing measurements to be performed, to indicate that a transmission can be used for WLAN sensing, and to exchange WLAN sensing feedback and information;

WLAN sensing operation that relies on transmissions that are requested, unsolicited, or both"

Some sensing approaches use statistics based on channel estimates. Typically, several channel estimates are made over time and machine learning techniques are applied to the channel estimates in order to make inferences and/or take decisions (e.g., regarding device positioning, radio environments, etc.).

It may be desirable in WLAN sensing to enable the sensing STA (the receiver in the terminology above) to perform channel estimates at regular time intervals. For example, it has been proposed to define a periodicity for the channel measurements (e.g., 50 ms or 200 ms) and a time mask that the transmitter needs to fulfil such that any jitter around the ideal period (the specified time in the terminology above) can be handled.

Channel estimation in IEEE 802.11 is typically based on LTFs. An LTF is an orthogonal frequency division multiplexing (OFDM) symbol which is known at the receiver. Also typically, one or more LTFs are located in the physical layer (PHY) preamble of each PPDU, and sensing STAs can utilize the LTFs for channel estimation. Generally, PPDUs used for sensing may also carry data, and the recipient of the data may be the sensing STA or another STA.

Ideally, a sensing STA would receive an LTF at each specified time (e.g., with a fixed periodicity). This is, however, typically difficult to achieve since channel access in WLAN is based on an LBT procedure (CSMA/CA) with random backoff. For this reason, there will typically be some jitter in the transmission times of LTFs; in relation to the specified times.

As can be understood from the description herein, some embodiments provide approaches that reduce such jitter and/or approaches to handle remaining jitter for channel estimation.

In the following example, the specified time will be termed target LTF transmission time (TLTT). The TLTTs may be used to coarsely define LTF transmission times, and PPDU padding and/or PPDU midamble(s) may be used in order to finely control the LTF transmission times.

For example, a fixed schedule may be defined, comprising periodically occurring TLTTs within a bounded time interval. The TLLT periodicity, as well as the start and duration of the bounded time interval, may be negotiated/handshaken between the transmitting and receiving STAs (compare with step 110 of FIG. 1, step 210 of FIG. 2, and 331, 332 of FIG. 3).

In some embodiments, the transmitting and sensing STAs may negotiate/handshake a maximum acceptable absolute deviation (MAAD) from the TLTT. If the transmitting STA determines that it cannot transmit an LTF within a MAAD from a TLTT for some reason (e.g., because the transmission medium is busy), it may refrain from transmitting the PPDU altogether, or may refrain from inserting LTFs intended for sensing in the PPDU.

In some embodiments, the transmitting and sensing STAs may negotiate/handshake the number of space-time streams.

Thus, the use of TLTTs allow coarse timing of LTF transmissions. The LTF transmission times can be further refined by means of midambles. IEEE 802.11ax and IEEE 802.11bd utilize midambles, which are LTFs interspersed within the data in (e.g., a periodic fashion). The original purpose of the midambles is to allow receiving STAs to update channel estimates when the channel varies rapidly with time. Sensing STAs can utilize LTFs in the PHY preamble and/or LTFs in midamble(s) for channel estimation.

For example, if the medium is idle and the random backoff is small, the transmitting STA may gain access to the channel earlier than what is suitable for the PHY preamble LTF to match the TLTT. Then, the jitter in the LTF transmission (i.e., the deviation of the closest LTF from the TLTT) can be reduced by inserting midambles; e.g., as illustrated in part (a) of FIG. 4.

However, using a plurality of midambles may cause unnecessary overhead (especially when the channel varies slowly). This may be solved by the transmitting STA inserting one (or a few) floating midamble; e.g., as illustrated in part (c) of FIG. 4. Unlike the IEEE 802.11ax/bd midambles, the floating midamble is generally not periodic, but typically occurs only once in a PPDU. Its location in the PPDU is arbitrary and is adjusted by the transmitting STA. The presence and location of the floating midamble may be indicated in a signaling field of the PHY preamble.

Typically, a STA can more easily control the actual LTF transmission time if it occurs within a Transmission Opportunity (TXOP). In some embodiments, the transmitting STA contends for the channel and—conditional on obtaining a TXOP—calculates the transmission times of the PPDUs within the TXOP and inserts midambles or a floating midamble in the PPDU whose transmission time is closest to the TLTT; e.g., as illustrated in parts (b) and (d) of FIG. 4.

Alternatively or additionally, the transmission time of a PPDU in a sequence of PPDUs may be adjusted to reduce the jitter of the LTF transmission time. Adjustment may, for example, be achieved by delaying or advancing a default transmission time of the physical layer packet. Data padding to prolong a previous physical layer packet is one possibility for delaying a default transmission time of the physical layer packet; e.g., as illustrated in part (e) of FIG. 4. Data diminishing (e.g., data puncturing) to shorten a previous physical layer packet is one possibility for advancing a default transmission time of the physical layer packet.

Thus, one aim of various embodiments may be to ensure that an LTF is transmitted at a specified time (or within a MAAD therefrom). There may, however, be situations where it is be cumbersome for the transmitter to fulfill such requirements (e.g., because it is not possible to gain channel access and/or because the midamble overhead is not preferable). To this and, there are also provided approaches for a receiving/sensing STA to handle situations where there is no LTF transmitted at the specified time (or within a MAAD therefrom). This is achieved by means of interpolation or extrapolation (as applicable) at the sensing STA. However, even in these embodiments, the transmitting STA needs to position LTFs in a way that enables interpolation or extrapolation.

For channel estimates by means of interpolation, the transmitter transmits at least two LTFs (fields in the terminology above), wherein at least one LTF is transmitted earlier than the TLTT and at least one LTF is transmitted later than the TLTT. The receiver uses the at least two LTFs to calculate a channel estimate at the TLTT.

For example, the receiver may perform channel estimation at the times where the two LTFs closest to the TLTT are received and combine the channel estimates by means of linear interpolation.

Alternatively, the channel estimation may be performed based on an interpolation of the two LTFs, which corresponds to the estimated LTF content at the TLTT.

In either case, more than two LTFs may be used to further improve the interpolation; e.g., by non-linear fitting. This may be preferable, for example, when the time distance (duration) between the LTFs is relatively large and/or when the channel is changing rapidly.

Interpolation can be expected to result in high accuracy at the cost of a limited complexity increase at the receiver side. However, the requirement that LTFs must be transmitted on both sides of the TLTT may lead to similar issues as transmitting a LTF at the TLTT (or within the MAAD therefrom). For example, a relatively large number of LTFs may need to be transmitted; implying relatively large overhead and/or relatively long channel occupancy. To enable for a more spectrum efficient approach to provide the receiver with information for estimating the channel at the TLTT, the receiver may be configured for extrapolation and the transmitter does not necessarily have to transmit LTFs on both sides of the TLTT.

For channel estimates by means of extrapolation, the transmitter transmits at least two LTFs (fields in the terminology above), wherein both LTFs are transmitted earlier than the TLTT or both LTFs are transmitted later than the TLTT. The receiver uses the at least two LTFs to calculate a channel estimate at the TLTT.

For example, the receiver may perform channel estimation at the times where the two LTFs closest to the TLTT are received and combine the channel estimates by means of linear extrapolation.

Alternatively, the channel estimation may be performed based on an extrapolation of the two LTFs, which corresponds to the estimated LTF content at the TLTT.

In either case, more than two LTFs may be used to further improve the extrapolation; e.g., by non-linear fitting. This may be preferable, for example, when the time distance (duration) between the closest LTF and the TLTT is relatively large.

For example, when it is likely that the transmitter will gain access to the channel within 2 μs after starting to try to obtain channel access, the transmitter may initiate the LBT procedure 1 μs before the TLTT, so that it will probably gain access to the channel at TLTT±1 μs. Irrespectively when the transmitter gains access to the channel, it then sends two LTFs. If the transmitter gains access to the channel early (so that the both LTFs are transmitted before the TLTT), the channel estimate at the TLTT may be obtained by prediction, i.e., by extrapolation into the future. If the transmitter gains access to the channel a little later (so that the first LTF is sent before the TLTT and the second LTF is sent after the TLTT), the channel estimate at the TLTT may be obtained by interpolation. If the transmitter gains access to the channel late (so that the both LTFs are transmitted after the TLTT), the channel estimate at the TLTT may be obtained by backward prediction, i.e., by extrapolation into the past.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

Figure 7:
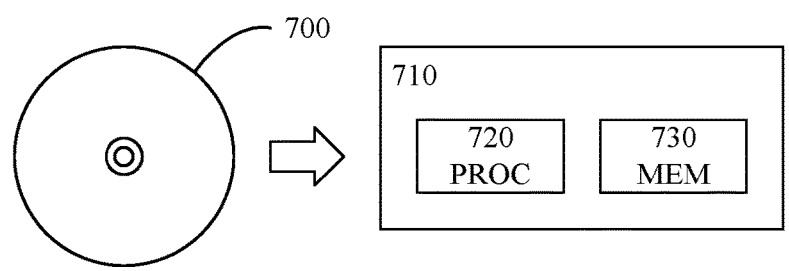
FIG. 7 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry or a data processing unit) 720, which may, for example, be comprised in a wireless communication device 710. When loaded into the data processor, the computer program may be stored in a memory (MEM) 730 associated with or comprised in the data processor. According to some embodiments, the computer program may, when loaded into and run by the data processor, cause execution of method steps according to, for example, any of the methods illustrated in FIGS. 1 and 2; or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable.

Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of a transmitter configured to transmit a physical layer packet in accordance with a listen-before-talk procedure, the method comprising:
   acquiring an indication of a specific time for channel estimation;
   providing the physical layer packet with at least one measurement signal for channel estimation based on the specific time, providing the physical layer packet with at least one measurement signal for channel estimation based on the specific time comprising providing the physical layer packet with a floating midamble which comprises one or more measurement signals for channel estimation;
   transmitting the physical layer packet; and
   preparing two or more versions of the physical layer packet, each version having the at least one measurement signal inserted at different positions, and providing the physical layer packet with at least one measurement signal for channel estimation based on the specific time comprising selecting one of the versions of the physical layer packet for transmission, selecting one of the versions of the physical layer packet for transmission comprising selecting the version which has the measure signal closest to the specific time.

2. The method of claim 1, wherein providing the physical layer packet with the floating midamble and transmitting the physical layer packet comprises timing the floating midamble to coincide with the specific time, or to occur at a time which is less than a second time distance value, or a less than a second time duration value, from the specific time.

3. The method of claim 1, further comprising including, in a preamble of the physical layer packet, an indication of a location of the floating midamble within the physical layer packet.

4. The method of claim 1, wherein transmitting the physical layer packet is performed within a transmission opportunity, and wherein timing comprises prolonging a previous physical layer packet of the transmission opportunity to adjust a transmission time of the physical layer packet.

5. The method of claim 1, wherein providing the physical layer packet with at least one measurement signal for channel estimation based on the specific time comprises providing the physical layer packet with at least two fields, wherein each field comprises one or more measurement signals for channel estimation, and wherein each field is either a midamble or a part of a preamble of the physical layer packet.

6. The method of claim 5, wherein the at least two fields have a time distance, or a time duration, between adjacent fields that is less than twice of a third time distance value, or less than twice of a third time duration value.

7. The method of claim 5, wherein providing the physical layer packet with the fields and transmitting the physical layer packet comprises timing an initial field to occur before, or coincide with, the specific time and timing a last field to occur after, or coincide with, the specific time.

8. The method of claim 5, wherein providing the physical layer packet with the fields and transmitting the physical layer packet comprises timing one of the fields to coincide with the specific time, or to occur at a time which is less than a fourth time distance value, or less than a fourth time duration value, from the specific time.

9. The method of claim 5, further comprising determining the number of fields based on a maximum distance, or a maximum duration, between the specific time and a closest field to the specific time.

10. The method of claim 1, further comprising acquiring an indication of a maximum acceptable absolute deviation.

11. The method of claim 1, wherein the at least one measurement signal for channel estimation comprises at least two measurement signals for channel estimation.

12. A non-transitory computer readable medium, having thereon a computer program comprising program instructions, the computer program being loadable into a data processing unit and configured to perform a method for transmitting a physical layer packet in accordance with a listen-before-talk procedure when the computer program is run by the data processing unit, the method comprising:
   acquiring an indication of a specific time for channel estimation;
   providing the physical layer packet with at least one measurement signal for channel estimation based on the specific time, providing the physical layer packet with at least one measurement signal for channel estimation based on the specific time comprising providing the physical layer packet with a floating midamble which comprises one or more measurement signals for channel estimation;
   transmitting the physical layer packet; and
   preparing two or more versions of the physical layer packet, each version having the at least one measurement signal inserted at different positions, and providing the physical layer packet with at least one measurement signal for channel estimation based on the specific time comprising selecting one of the versions of the physical layer packet for transmission, selecting one of the versions of the physical layer packet for transmission comprising selecting the version which has the measure signal closest to the specific time.

13. An apparatus for a transmitter configured to transmit a physical layer packet in accordance with a listen-before-talk procedure, the apparatus comprising controlling circuitry configured to cause:
   acquisition of an indication of a specific time for channel estimation;
   provision, in the physical layer packet, of at least one measurement signal for channel estimation based on the specific time, the controlling circuitry being configured to cause provision of the physical layer packet with at least one measurement signal for channel estimation based on the specific time by causing the physical layer packet to be provided with a floating midamble which comprises one or more measurement signals for channel estimation;
   transmission of the physical layer packet; and
   preparation of two or more versions of the physical layer packet, each version having the at least one measurement signal inserted at different positions, and provision of the physical layer packet with at least one measurement signal for channel estimation based on the specific time comprising selection of one of the versions of the physical layer packet for transmission, selection of one of the versions of the physical layer packet for transmission comprising selection of the version which has the measure signal closest to the specific time.

14. The apparatus of claim 13, wherein the controlling circuitry is configured to cause provision of the physical layer packet with the floating midamble and transmission of the physical layer packet by causing timing of the floating midamble to coincide with the specific time, or to occur at a time which is less than a second time distance value, or less than a second time duration value, from the specific time.

15. The apparatus of claim 13, wherein the controlling circuitry is further configured to cause inclusion, in a preamble of the physical layer packet, of an indication of a location of the floating midamble within the physical layer packet.

16. The apparatus of claim 13, wherein the controlling circuitry is configured to cause transmission of the physical layer packet to be performed within a transmission opportunity, and to cause timing by causing prolonging of a previous physical layer packet of the transmission opportunity to adjust a transmission time of the physical layer packet.

17. The apparatus of claim 13, wherein the controlling circuitry is configured to cause provision of the physical layer packet with at least one measurement signal for channel estimation based on the specific time by causing the physical layer packet to be provided with at least two fields, wherein each field comprises one or more measurement signals for channel estimation, and wherein each field is either a midamble or a part of a preamble of the physical layer packet.

18. The apparatus of claim 13, wherein the controlling circuitry is further configured to cause acquisition of an indication of a maximum acceptable absolute deviation.

19. The apparatus of claim 13, wherein the at least one measurement signal for channel estimation comprises at least two measurement signals for channel estimation.

20. The apparatus of claim 13, wherein the apparatus is comprised in a transmitter device.

\* \* \* \* \*